United States Patent [19]

Yamazaki et al.

[11] Patent Number: 5,556,584
[45] Date of Patent: Sep. 17, 1996

[54] PROCESS OF FORMING A SEAL STRUCTURE FOR A VEHICULAR LAMP

[75] Inventors: Kazuhiro Yamazaki; Kazuo Akiyama; Michihiko Suzuki, all of Shizuoka, Japan

[73] Assignee: Koito Manufacturing Co., Ltd., Tokyo, Japan

[21] Appl. No.: 159,749

[22] Filed: Dec. 1, 1993

[30] Foreign Application Priority Data

Dec. 4, 1992 [JP] Japan ................................. 4-325815

[51] Int. Cl.⁶ ........................... B29C 44/06; B29C 44/12
[52] U.S. Cl. .................. 264/46.5; 264/46.6; 264/238; 264/252; 264/261
[58] Field of Search ................... 264/252, 46.4, 264/46.5, 261, 263, 278, 46.6, 238

[56] References Cited

U.S. PATENT DOCUMENTS

| | | |
|---|---|---|
| 4,831,502 | 5/1989 | Fujino et al. . |
| 4,881,152 | 11/1989 | Watanabe et al. . |
| 4,928,215 | 5/1990 | Fujino et al. . |
| 4,931,912 | 6/1990 | Kawakami et al. . |
| 4,938,831 | 7/1990 | Wolf, Jr. ............................. 156/107 |
| 4,972,301 | 11/1990 | Kasboske ............................. 362/61 |
| 5,014,165 | 5/1991 | Naganawa . |
| 5,021,930 | 6/1991 | Yamada . |
| 5,032,964 | 7/1991 | Endo et al. . |
| 5,069,852 | 12/1991 | Leone et al. ......................... 264/252 |
| 5,111,368 | 5/1992 | Suzuki et al. . |
| 5,121,303 | 6/1992 | Shirai et al. . |
| 5,129,807 | 7/1992 | Oriez et al. ......................... 264/252 |
| 5,156,445 | 10/1992 | Sato . |
| 5,158,350 | 10/1992 | Sato . |

FOREIGN PATENT DOCUMENTS

| | | |
|---|---|---|
| 2010418 | 6/1979 | European Pat. Off. . |
| 0300482 | 1/1989 | European Pat. Off. . |
| 0326276 | 8/1989 | European Pat. Off. . |
| 2220736 | 1/1990 | European Pat. Off. . |
| 0469981 | 2/1992 | European Pat. Off. . |
| 2256919 | 12/1992 | European Pat. Off. . |
| 2853767 | 6/1979 | Germany ........................ 264/46.5 |
| 183202 | 6/1989 | Japan . |
| 2123010 | 10/1990 | Japan . |

Primary Examiner—Allan R. Kuhns
Attorney, Agent, or Firm—Sughrue, Mion, Zinn, Macpeak & Seas

[57] ABSTRACT

A seal structure between a leg part 15 of a front lens and a seal groove 12, wherein a seal member 20 is applied into the seal groove 12 formed on a periphery of a front opening portion of a lamp body 10, the leg part 15 of the front lens engaging with the seal groove 12 is secured to the seal groove 12 by a mechanical fastening means (clip 30) to prevent a removal, and the seal member 20 in the seal groove 12 is compressed by the lens leg part 15, characterized in that the seal member 20 is formed of a solid foamed material which foams from an initial fluid state and hardens while keeping elasticity, and which can be stripped off.

5 Claims, 4 Drawing Sheets

PROCESS OF FORMING A SEAL STRUCTURE FOR A VEHICULAR LAMP

BACKGROUND OF THE INVENTION

1. Field of the Invention

The present invention relates to a vehicular lamp, and more particularly to a seal structure provided between a seal groove formed on a lamp body of the vehicular lamp and a leg part of a front lens fit on the seal groove, and process for providing the same.

2. Conventional Arts

As a seal structure between a leg part of a front lens and a seal groove for a vehicular lamp, there has been widely known a structure in which a hot melt material as a seal member is applied to the seal groove, and then the leg part of the front lens is fitted into the seal groove so that the leg part of the lens and the seal groove are sealed together by the hardened hot melt material.

However, the conventional seal structure employing the hot melt material as mentioned above suffers from a problem that since the hardened hot melt material has a strong adhesive strength it is difficult to strip off, at a later date, the front lens from the seal groove if someone wants to exchange only one of the lamp body. Therefore, the lamp body as well as the front lens must have been exchanged together as one unit. For this reason, for example, when the automobile is scrapped the lens cannot be used again for a new car even if the front lens has no damage. On the other hand, if a front lens is broken by a hit of a small stone while driving the car, not only a new front lens but also the lamp body must be exchanged even if the latter is still new. In other words, no recycling has been available with the conventional seal structure. In the past, so many scrapped automobiles have caused environmental disruptions because of the industrial waste which requires much spaces as a dumping ground. The recent strong demand is to recycle parts of the automobiles to new cars. With respect to front lens and lamp bodies of vehicular lamps, the conventional seal structure cannot satisfy such a demand because these parts cannot be separated from each other.

Further, the conventional seal structure also suffers from a difficulty that a shrinkage occurred when the hot melt material hardens causes a gap between the seal groove and the hot melt material, which deteriorates waterproofing efficiency.

In view of the foregoing difficulties, there have been proposed improved seal structures capable of recycling lamp parts by separating a front lens from a seal groove of a lamp body if required. One example of such a structure is as disclosed in Unexamined Japanese Utility Model Application No. Hei. 1-83202. This structure employs, as shown in FIG. 1, an elastic member 3 which is unitarily formed with an end portion of a leg part 2 of a lens body 1. The elastic member 3 acts as a packing member for engaging the leg part 2 with a housing of the lamp body. With this structure, since the packing member 3 is unitarily formed with the leg part 2 previously the leg part 2 of the lens 1 can be assembled onto a seal groove 4 by merely engaging the leg part 2 of the lens 1 with the seal groove 4.

With the first proposed structure as disclosed in Unexamined Japanese Utility Model Application (OPI) No. Hei. 1-83202 and shown in FIG. 1, however, since the packing member 3 has a size enough to sufficiently pressure-fitted into the seal groove 4 to accomplish the sufficient waterproof between the packing member 3 and the seal groove 4, it is difficult during assembly to engage the packing member 3 integrally formed with the leg part 2 of the lens 1 with the seal groove 4.

There has been proposed another type of the improved seal structure as disclosed in Unexamined Japanese Utility Model Application (OPI) No. Hei. 2-123010. In this structure, as shown in FIG. 2, a hollow packing member 5 is first fixed in a seal groove 4, and then a leg part 2 of a lens 1 comes into engagement with the seal groove 4 from a top of the packing member 5 thereby to maintain a compressed condition of the hollow packing member 5. The leg part 2 is provided with a protrusion 2a extending radially outward thereof and engaging with an opening 4c disposed on a side wall of the seal groove 4 to accomplish a mechanical engagement between the lens 1 and the lamp body.

However, in the structure as disclosed in Unexamined Japanese Utility Model Application (OPI) No. Hei. 2-123010 and shown in FIG. 2, although it may be easy to insert the hollow packing member 5 in the seal groove 4, the packing member 5 may be fitted eccentrically toward one of side walls 4a and 4b of the seal groove 4. Therefore, it is not easy to achieve a uniform sealing pressure along the entire direction of the seal groove 4, which would suffer from a problem in deteriorating the sealability.

SUMMARY OF THE INVENTION

The present invention was made in view of the foregoing difficulties accompanying the conventional and proposed seal structures. Accordingly, a primary object of the invention is to furnish an improved seal structure between a leg part of a front lens and a seal groove for a vehicular lamp capable of removing the front lens from the lamp body at a later date for a minimum exchange and a recycling.

Another object of the invention is to provide an improved seal structure between a leg part of a front lens and a seal groove for a vehicular lamp capable of accomplishing an easy assembly and also an improved sealability.

The afore-mentioned and other objects can be achieved by a provision of processes for providing a seal structure between a leg part of a front lens and a seal groove formed on a lamp body for vehicular lamps which, according to the present invention, includes a step of applying a seal member formed of a two-part foam material into the seal groove formed on a periphery of a front opening portion of a lamp body, securing the leg part of the front lens connected to the seal groove to the seal groove by a mechanical engagement means to prevent from removing, urging the seal member injected into the seal groove by the leg part of the lens and kept in a compressed state. The seal member is formed of a solid foamed material which foams from an initial fluid state and hardens while maintaining its elasticity. The seal member also can be stripped off the seal groove at a later date.

Further, with respect to another aspect of the invention, in the seal structure the leg part of the lens is kept in a state where it engages with the seal groove spaced apart therefrom by a predetermined distance along the engagement direction therewith during the foaming of the seal member in a fluid state, and after the end of the leg part of the lens is enveloped by the seal member foaming to expand itself the leg part of the lens is mechanically secured to the seal groove to keep the compressed state of the seal member.

Since the seal member is in a fluid state during the application it is very easy to apply the fluid seam member into the seal groove. The seal member foams to expand itself to press-contact to the seal groove and, therefore, no gap is formed between the seal groove and the seal member. The seal member applied into the seal groove then foams and hardens to be a solid state while maintaining its elasticity. After a predetermined time period the seal member is compressed by the leg part of the lens, and seals between the leg part of the lens and the seal groove. Since the seal member can be forcedly stripped off at a later date, the front lens or the lamp body can be recycled.

Further, the seal member foams to expand itself to cover the end of the leg part of the lens as mentioned above. In other words, the seal member can be uniformly applied between the leg part of the lens and a bottom surface of the seal groove along the entire direction of the seal groove. In this condition, the seal member can be compressed by the leg part of the lens and, accordingly, the sealing pressure generated by the seal member between the leg part of the lens and the seal groove can be uniformly maintained along the seal groove.

DESCRIPTION OF THE PREFERRED EMBODIMENTS

The embodiments of the invention will be described with reference to the drawings.

FIGS. 3 to 8 show an embodiment in which the present invention is applied to an engagement of a front lens of a vehicular headlamp with a seal groove.

Figure 1:
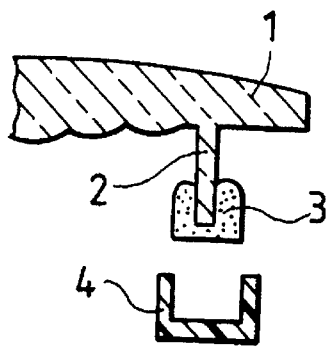
FIG. 1 is a sectional view showing an engagement portion of a leg part of a lens with the seal groove according to a conventional art.
Figure 2:
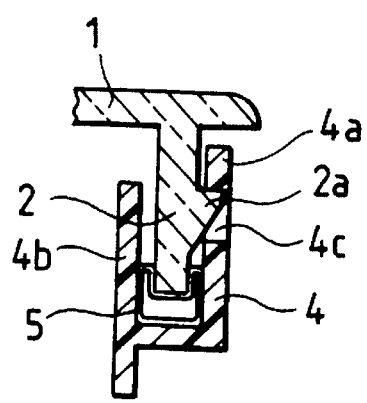
FIG. 2 is a sectional view showing an engagement portion of a leg part of a lens with the seal groove according to another conventional art.
Figure 3:
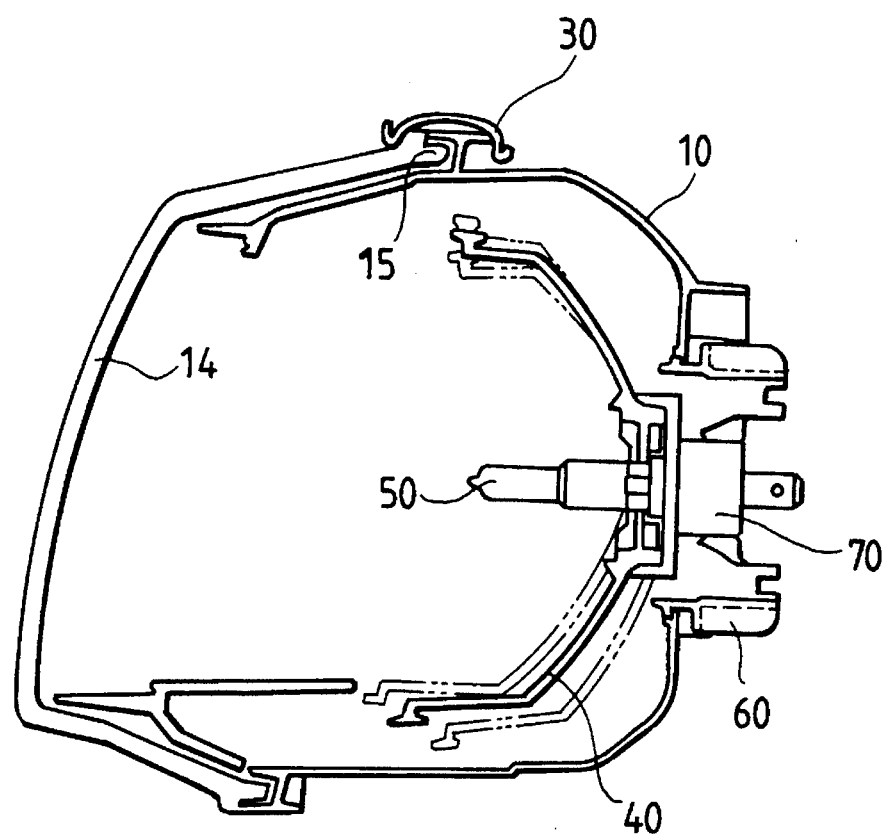
FIG. 3 is a sectional view of a vehicular lamp to which the present invention is applied.

FIG. 3 is a sectional view of a vehicular lamp to which the present invention is applied. The lamp includes a vessel-shaped lamp body 10 and a front lens 14 mounted on the body. The lamp body 10 accommodates therein a reflector 40 on which a bulb connector 70 is coupled. The bulb connector 70 is also coupled to the lamp body 10 through a rubber cover 60. A bulb 50 as a light source is mounted into the bulb connector 70. The front lens 14 engages with the lamp body by the seal structure and a clip 30 as a mechanical engaging means as described below in more detail. The clip 30 may be formed by bending a plate spring.

Figure 4:
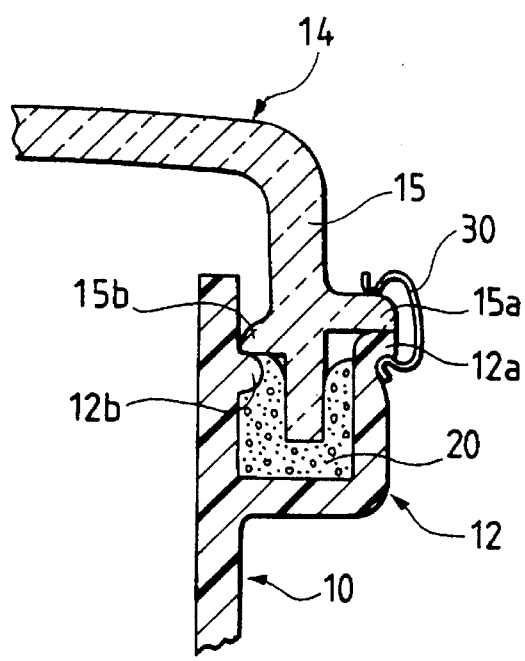
FIG. 4 is an enlarged sectional view showing an engagement portion of a leg part of a lens with the seal groove according to a first embodiment of the present invention.
Figure 5:
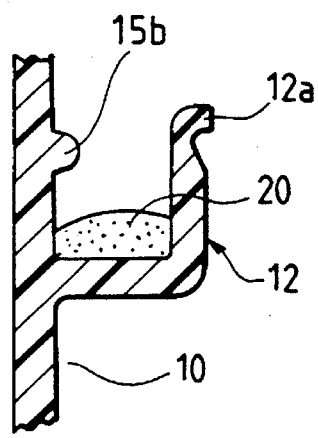
FIG. 5 is a view showing a step of injecting the fluid seal member into the seal groove.
Figure 6:
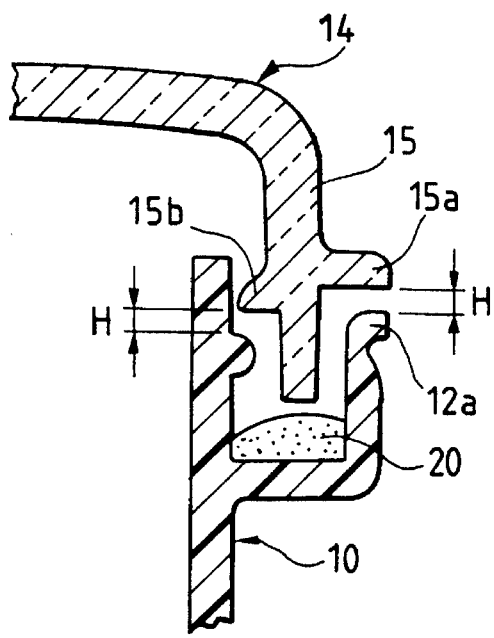
FIG. 6 is a view showing a step of engaging the leg part of the front lens with the seal groove.
Figure 7:
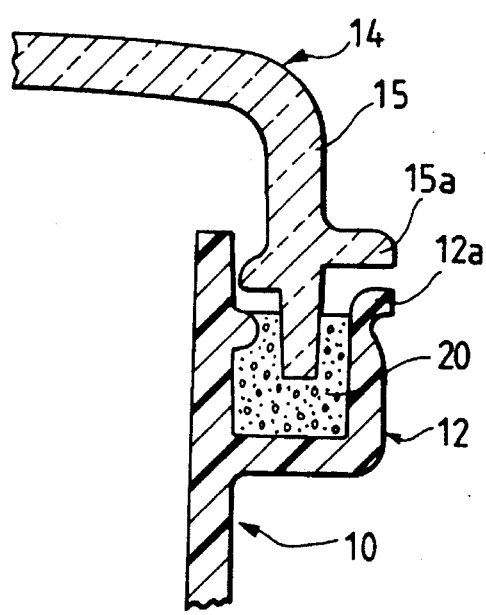
FIG. 7 is a view showing a step of foaming a fluid seal member to expand itself.
Figure 8:
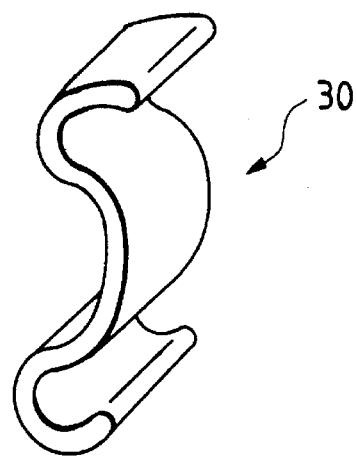
FIG. 8 is an enlarged perspective view of a clip as a mechanical securing means according to the invention.

FIG. 4 is an enlarged sectional view showing an engagement portion of a leg part 15 of the lens 14 with the seal groove 12, FIGS. 5 through 7 are explanately views showing steps of engagement of the lens 14 with the seal groove 12, and FIG. 8 is an enlarged perspective view of the clip 30.

The lamp body 10 is provided at a periphery of a front opening portion thereof with the seal groove 12 which is U-shaped in cross section. The front lens 14 has a size good for mounting on the front opening portion of the lamp body 10. The front lens 14 is provided at a periphery thereof with the leg part 15 for engaging with the seal groove 12 disposed at the lamp body 10. A seal member 20 having an elasticity is disposed between the lens leg part 15 and the seal groove 12. The seal member 20 is kept being compressed by the lens leg part 15 to seal the lens leg part 15 to the seal groove 12.

The clip 30 acting as a mechanical securing member is provided between a flange 15a of the lens leg part 15 and a flange-like extension part 12a projecting from an outer wall of the seal groove 12 for holding both the flange 15a and extension part 12a in a condition where they abut against each other. The seal groove 12 is also provided with an engaging protrusion 12b which abuts against and engages with a positioning protrusion 15b of the lens leg part 15 for confining an engagement amount of the lens leg part 15 inserting into the seal groove 12.

The seal member 20 is formed of, for example, a two-part polyurethane foam or a two-part silicone foam which is formulated by blending a main material and a hardening material so that the material has a blended ratio by volume within a range of 1:1 to 1:10 and a foam expansion ratio of two to four times.

As the two-part polyurethane foam material the invention may use, for example, of a type 9020 made by Matsushita Industry Co., Ltd., of a type 9080 made by Sonder Hoff GmbH or made by Inoac Inc. On the other hand, the two-part silicone foam material may be Chemiseal S-250 made by Chemitec Inc.

The main material and the hardening material are separately set into vessels and blended in a chamber and agitated therein. The blended material is injected from an outlet nozzle of the agitator chamber into the seal groove. The time required for blending, agitating and injecting depends on the material, blending ratio, volume of the chamber, and one example of which is about 30 seconds to 3 minutes. The injected amount is, for example, within a range of 0.3 to 1.0 ml/sec.

Five to ten minutes after the seal member 20 foams to expand itself from the initial fluid state and hardens thereafter, it turns to be a condition where a surface of which does not adhere to a finger touching the seal member, which condition is so called as a tack free condition. Thereafter, the seal member hardens completely when six to twenty-four hours elapsed. The seal member 20, foaming to expand itself in the seal groove 12 and changing into solid state having elasticity, then comes into press-contact to an inner surface of the seal groove 12. Therefore, no gap is generated between the seal member and the seal groove, as the conventional structure utilizing a hot melt material.

More specifically, one example of time steps for completing the seal structure according to the present invention will be described below.

The blended seal member (foam material) is injected into the seal groove and after a certain time period (cream time)

for ten seconds, the seal member starts to foam to expand itself which may require three minutes (rise time). Next, during the tack free time where the seal member is not hardened, which is after the rise time and before five to ten minutes after the initial step the leg part of the front lens is inserted into the seal groove and compresses the seal groove. Then the clip is mounted between the flange of the lens leg part and the seal groove to mechanically secure these members. At the time when the clip is mounted about 40% to 50% of the seal member is actually hardened, and at the time after twenty-four hours has elapsed from the initial step (injection step) about 90% of the seal member is hardened.

The seal member completely solidified in the seal groove 12 is not so difficult to be stripped off at a later date as different from the hot melt type material but easy to peeled off intentionally due to its property. Accordingly, in case where merely the front lens 14 is to be exchanged, for example, the lens 14 can be removed from the seal groove 12 together with the seal member 20, the seal member 20 adhering to the lens leg part 15 can be easily stripped off the lens leg part. Thereafter, a new front lens and a new seal member are provided and then a lens leg part of the new front lens can be unitarily engaged with the seal groove again.

Next, steps for fixedly engaging the lens leg part with the seal groove will be described in more detail hereinbelow.

First as shown in FIG. 5, a seal member 20 in fluid state is applied into the seal groove 12. The condition of the seal member 20 shown in FIG. 5 is so called a cream time. Then as shown in FIG. 6, an end of a leg part 15 of the lens 14 is inserted into the seal groove 14 while firmly maintaining a predetermined distance H between the flange 15a of the lens leg part 15 and the extension part 12a of the seal groove 12 along the entire engagement direction. The seal member 20 starts to foam and expand itself up to a position where it envelops the end portion of the lens leg part 15 as shown in FIG. 7. When a predetermined time elapses after the foaming and turns to be in a semi-solid state (tack free state), the lens leg part 15 is depressed down into the seal groove 12 to compress the seal member 20. Finally, a clip 30 is attached to fasten the lens 14 and the seal groove 12.

The seal structure realized as described above is a structure in which the seal member 20 unitarily couples to the end portion of the lens leg part 15, and the seal member 20 completely seals the lens leg part 15. Further, the seal member 20 unitarily adheres to an entire inner surface of the seal groove 12 and completely seals the seal groove 14. Furthermore, owing to the clip 30 the seal member 20 is compressed to maintain an eternal press-contact force against the lens leg part 15 and the seal groove 12, thereby to assure the waterproof efficiency at the engagement portion between the lens leg part 15 and the seal groove 12.

The seal member 20 which foams to expand itself comes to envelop the end portion of the lens leg part 15, while maintaining a constant condition at a region between the bottom of the seal groove 12 and the lens leg part 15 along the entire direction of the seal groove 12. Further, the seal pressure caused by the seal member compressed by the lens leg part 15 is also kept being constant along the seal groove 12. Accordingly, a durable waterproof efficiency is assured.

On the other hand, since the lens leg part 15 comes into press-contact to the seal groove 12 while the seal member 20 is in the semi-solid (tack free) condition, the depressing force applied by the front lens can be small. Also, the fastening force applied between the front lens 14 and the seal groove 12 can be small, that is, the small number of clips is required compared to the conventional structure, which causes the lamp assembly and the clip removal can be simplified.

Figure 9A:
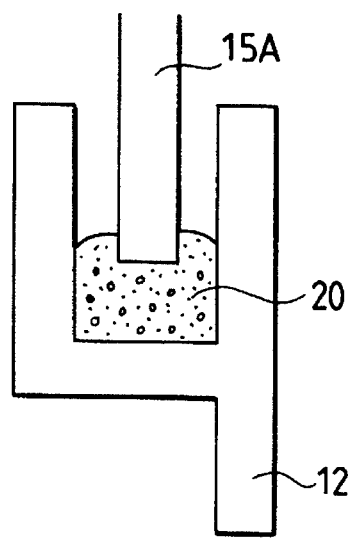
FIGS. 9A to 9D are schematical views showing arrangements of the end portion of the lens leg part according to the present invention.
Figure 9B:
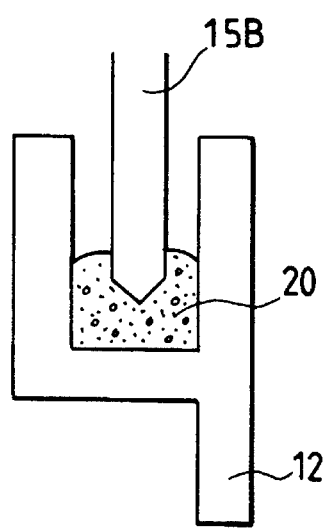
Figure 9C:
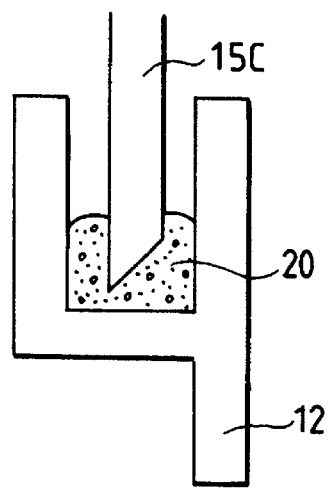
Figure 9D:
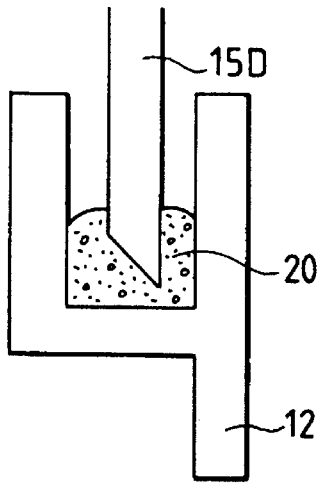

FIGS. 9A to 9D are schematical views showing arrangements of the end portion of the lens leg part according to the present invention. FIG. 9A shows a rectangular end portion 15A, FIG. 9B shows an end portion 15B both corners of which are cut away, FIG. 9C and FIG. 9D have a triangular end portions 15C and 15D merely one corner of which is cut away. In these arrangements, the end portion of the lens leg part shown in FIG. 9B is the most preferable because the compression force applied by the lens leg part to the seal member in the seal groove is substantially uniform in the lateral direction.

Figure 10:
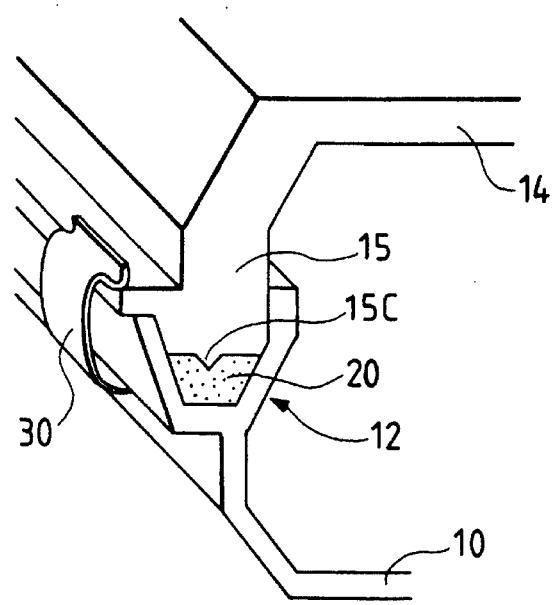
FIGS. 10 and 11 are perspective views showing another arrangements of the lens leg part and the seal groove.
Figure 11:
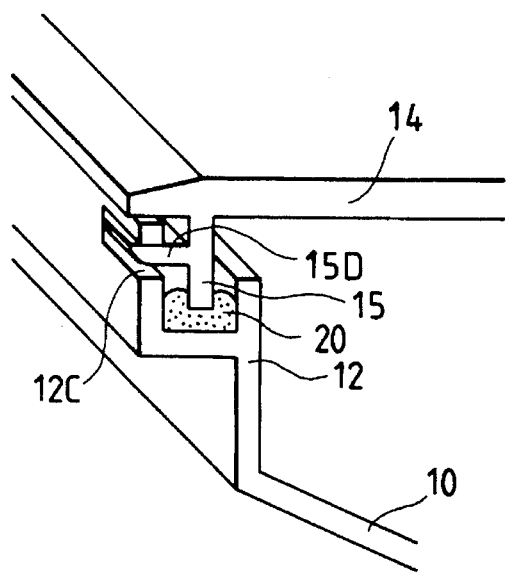

FIGS. 10 and 11 are perspective views showing another arrangements of the lens leg part and the seal groove.

In the arrangement shown in FIG. 10, the lens leg part 15 is provided with a projection along a bottom surface thereof for strengthen the engaging force between the lens leg part 15 and the seal groove 12. On the other hand, in the arrangement shown in FIG. 11, the seal groove 12 has a slit 12c whereas the lens leg part 15 is provided with a flange 15d fitting into the slit 12c for accomplishing a mechanical engagement of the lens leg part with the seal groove.

Figure 12:
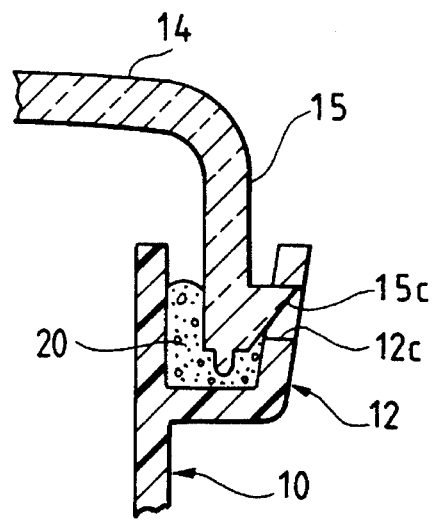
FIG. 12 is an enlarged sectional view showing an engagement portion of a leg part of a lens with the seal groove according to a second embodiment of the present invention.

FIG. 12 is a sectional view showing an engagement portion of a front lens with a seal groove according to a second embodiment of the present invention. In this embodiment, the lens leg part 15 of the front lens 14 is provided with a hook 15c which engages with an opening part 12c formed on an outer wall of the seal groove 12 to achieve a mechanical fastening between the lens leg part 15 and the seal groove 12. Other than this feature, the second embodiment is the same in structure as the first embodiment described above, and the detailed description will be omitted while using the same reference numerals.

As is apparent from the foregoing description, with the seal structure between the leg part of the front lens and the seal groove for a vehicular lamp according to the present invention, since the seal member is formed of an elastic solid foamed material after hardened which can be intentionally stripped off the seal groove at a later date if demanded, the front lens or the lamp body assembled to a scrapped car can be used again for a new car thereby accomplishing a recycling.

Further, since the seal member is in a fluid state when it is applied to the seal groove it is very easy to apply the seal member into the seal groove.

Furthermore, since the injected seal member foams to expand itself and then becomes a solid elastic member press-fitted in the seal groove and, at the same time, the seal member is kept being compressed between the lens leg part and the seal groove by means of the mechanical fastening, the lens leg part is firmly sealed to the seal groove.

Moreover, the foamed seal member envelops the end portion of the lens leg part, and it is uniformly provided between the lens leg part and the bottom surface of the seal groove along the longitudinal direction of the seal groove. In this condition, since the seal member is compressed by the lens leg part, the sealing pressure generated by the seal member between the lens leg part and the seal groove is uniform along the seal groove. Therefore, a durable sealing efficiency can be assured.

What is claimed is:

1. A method of sealing a lens to a lamp body, said lens including a flange (15a) extending around the periphery thereof and a leg portion extending from said flange, said lamp body including a groove (12) extending around a front peripheral portion thereof and defined by an extension portion (12a), comprising the following steps:

injecting a foam sealant into said groove when said sealant is in a liquid state;

inserting said leg portion of said lens into said groove while said foam sealant remains in said liquid state;

allowing said foam sealant to expand such that said foam sealant at least partially surrounds said leg portion and assumes a semi-solid state thereby retaining said leg portion of said lens within said groove; and forcing said leg portion further into said groove after said foam sealant has expanded and assumed said semi-solid state to thereby compress said foam sealant and, thereafter, mechanically fastening said flange of said lens to said extension portion of said lamp body, wherein in said inserting step said leg portion is inserted to an extent that a space of a predetermined distance remains between said flange and said extension portion so that said leg portion of said lens does not contact a bottom of said groove.

2. The method of claim 1, further comprising the step of forming said foam sealant using polyurethane by blending a main material and a hardening material within a ratio range of 1:1 to 1:10.

3. The method of claim 1, further comprising the step of forming said foam sealant using silicone by blending a main material and a hardening material within a ratio range of 1:1 to 1:10.

4. The method of claim 1, wherein said foam sealant has an expansion ratio between 1:2 and 1:4.

5. The method of claim 1, wherein said foam sealant is removable from said groove.

\* \* \* \* \*